United States Patent
Hikida (10) Patent No.: US 11,668,048 B2
(45) Date of Patent: Jun. 6, 2023

(54) SHOE PRESS BELT (71) Applicant: Yamauchi Corporation, Hirakata (JP)

(72) Inventor: Takahisa Hikida, Hirakata (JP)

(73) Assignee: Yamauchi Corporation, Hirakata (JP)

( * ) Notice: Subject to any disclaimer, the term of this patent is extended or adjusted under 35 U.S.C. 154(b) by 320 days.

(21) Appl. No.: 16/958,471

(22) PCT Filed: Dec. 27, 2018

(86) PCT No.: PCT/JP2018/048048
§ 371 (c)(1),
(2) Date: Jun. 26, 2020

(87) PCT Pub. No.: WO2019/131835
PCT Pub. Date: Jul. 4, 2019

(65) Prior Publication Data
US 2021/0062423 A1 Mar. 4, 2021

(30) Foreign Application Priority Data
Dec. 27, 2017 (JP) .............................. JP2017-252106

(51) Int. Cl.
| C08G 18/10 | (2006.01) |
| C08G 18/32 | (2006.01) |
| C08G 18/44 | (2006.01) |
| C08G 18/76 | (2006.01) |
| C08J 5/24 | (2006.01) |
| D21F 3/02 | (2006.01) |

(52) U.S. Cl.
CPC ............... *D21F 3/02* (2013.01); *C08G 18/10* (2013.01); *C08G 18/3206* (2013.01); *C08G 18/3215* (2013.01); *C08G 18/44* (2013.01); *C08G 18/7671* (2013.01); *C08J 5/247* (2021.05); *C08J 5/249* (2021.05); *C08J 2375/04* (2013.01)

(58) Field of Classification Search
USPC .................................... 528/44, 196; 172/358
See application file for complete search history.

(56) References Cited

U.S. PATENT DOCUMENTS

| 10,731,294 B2 * | 8/2020 | Hikida ................. D21F 3/0227 |
| 2005/0287373 A1 | 12/2005 | Ishino et al. |
| 2010/0130701 A1 | 5/2010 | Lahdensuo |
| 2010/0186920 A1 | 7/2010 | Yazaki et al. |
| 2010/0314067 A1 | 12/2010 | Yazaki et al. |
| 2013/0192788 A1 | 8/2013 | Yazaki et al. |
| 2015/0308044 A1 | 10/2015 | Delmas et al. |
| 2016/0130755 A1 | 5/2016 | Yamazaki et al. |
| 2016/0355978 A1 | 12/2016 | Takamori et al. |
| 2017/0044369 A1 * | 2/2017 | Yoshida ................. C08L 77/06 |
| 2018/0094385 A1 | 4/2018 | Hikida |

FOREIGN PATENT DOCUMENTS

| CN | 1712636 A | 12/2005 |
| CN | 1934151 A | 3/2007 |
| CN | 101547985 A | 9/2009 |
| CN | 104245772 A | 12/2014 |
| CN | 105339546 A | 2/2016 |
| CN | 106245407 A | 12/2016 |
| EP | 2 169 112 A1 | 3/2010 |
| JP | 2008-111220 A | 5/2008 |
| JP | 2009-185427 A | 8/2009 |
| JP | 2010-116652 A | 5/2010 |
| JP | 2010-532432 A | 10/2010 |
| JP | 2013-159859 A | 8/2013 |
| JP | 2015-81278 A | 4/2015 |
| JP | 3201639 U | 12/2015 |
| JP | 2016-199813 A | 12/2016 |
| WO | 2005/090429 A1 | 9/2005 |
| WO | 2008/052134 A1 | 5/2008 |
| WO | 2009/001766 A1 | 12/2008 |
| WO | 2009/099114 A1 | 8/2009 |
| WO | 2013/122812 A1 | 8/2013 |
| WO | 2016/163350 A1 | 10/2016 |

OTHER PUBLICATIONS

Communication dated Sep. 6, 2021 by the Chinese Patent Office in Chinese Application No. 201880083906.0.
Extended European Search Report dated Sep. 10, 2021 in European Application No. 18894119.9.
International Search Report for PCT/JP2018/048048 dated Mar. 12, 2019 (PCT/ISA/210).

* cited by examiner

*Primary Examiner* — Terressa Boykin
(74) *Attorney, Agent, or Firm* — Sughure Mion, PLLC (57) ABSTRACT

A shoe press belt includes a polyurethane in which a reinforcement base member is embedded, the polyurethane being in one piece with the reinforcement base member. The polyurethane constituting at least an outer circumferential surface of the shoe press belt includes, as an urethane prepolymer component, an aliphatic polycarbonatediol component and an aromatic diisocyanate component, and includes, as a curing agent component, an aliphatic diol component having a carbon number of less than or equal to 6 and an aromatic diol component having two hydroxyethoxy groups. A content of the aromatic diol component with respect to the aliphatic diol component and the aromatic diol component is more than or equal to 10 mass % and less than or equal to 50 mass %. Accordingly, there is provided a shoe press belt suppressed in generation and development of a crack.

5 Claims, 2 Drawing Sheets

SHOE PRESS BELT

CROSS REFERENCE TO RELATED APPLICATIONS

This application is a National Stage of International Application No. PCT/JP2018/048048 filed Dec. 27, 2018, claiming priority based on Japanese Patent Application No. 2017-252106, filed Dec. 27, 2017.

TECHNICAL FIELD

The present invention relates to a shoe press belt, particularly, a polyurethane constituting at least an outer circumferential surface of the shoe press belt.

BACKGROUND ART

In recent years, in order to increase an effect of dewatering a wet paper web in a press part of a paper-making process, the following method (so-called "shoe press") has been widely used: one surface of the wet paper web disposed on a felt traveling at a high speed is pressed by a press roll and the other surface of the wet paper web is pressed by a pressure applying shoe with an endless belt interposed therebetween, thereby dewatering the wet paper web. In the shoe press, an endless belt (hereinafter, also referred to as "elastic belt"), in which a reinforcement base member is in one piece with a thermosetting polyurethane, has been conventionally used. The elastic belt for the press part normally has an outer circumferential surface provided with a multiplicity of drainage grooves along the circumferential direction. Moreover, in recent years, use of such shoe press and elastic belt has been considered for a calender process in which a surface of paper is smoothened to provide luster. Further, particularly in the paper making at a high speed, a sheet transfer elastic belt for preventing cut of paper and stably transferring the wet paper web may be also nipped in the shoe press.

In the shoe press, the belt is severely bent and pressed repeatedly between the press roll and the pressure applying shoe. Such an elastic belt is replaced due to generation of a crack as well as reduction of a volume of a drainage groove, i.e., reduction of VV (void volume), by hydrolysis or the like. In view of this, in order to provide a shoe press belt having a high hydrolysis resistance and suppressed in generation and development of a crack, Japanese Patent Laying-Open No. 2016-199813 (Patent Literature 1) discloses a shoe press belt, wherein a polyurethane constituting at least an outer circumferential surface of the shoe press belt is a thermosetting polyurethane obtained by curing an urethane prepolymer using a curing agent, and the urethane prepolymer includes a first urethane prepolymer obtained by a reaction between an aromatic diisocyanate and a polyol component containing an aliphatic polycarbonatediol having a predetermined chemical structure.

Meanwhile, in order to provide a shoe press belt having excellent crack resistance, bending fatigue resistance, and wear resistance, each of Japanese Patent Laying-Open No. 2008-111220 (Patent Literature 2) and Japanese Patent Laying-Open No. 2009-185427 (Patent Literature 3) discloses a shoe press belt containing a polyurethane layer obtained by curing a composition in which an urethane prepolymer is mixed with a compound selected from an aliphatic diol compound, hydroquinone bis-β hydroxyethyl ether, and an organic polyamine compound.

CITATION LIST

Patent Literature

PTL 1: Japanese Patent Laying-Open No. 2016-199813
PTL 2: Japanese Patent Laying-Open No. 2008-111220
PTL 3: Japanese Patent Laying-Open No. 2009-185427

SUMMARY OF INVENTION

Technical Problem

Each of the shoe press belt disclosed in Japanese Patent Laying-Open No. 2016-199813 (Patent Literature 1), Japanese Patent Laying-Open No. 2008-111220 (Patent Literature 2), and Japanese Patent Laying-Open No. 2009-185427 (Patent Literature 3) has high hydrolysis resistance and wear resistance; however, in order to achieve a longer life, further improvement in crack resistance is required to suppress generation and development of a crack.

In view of the above-described circumstances, the present invention has an object to provide a shoe press belt suppressed in generation and development of a crack.

Solution to Problem

A shoe press belt according to one embodiment of the present invention includes a polyurethane in which a reinforcement base member is embedded, the polyurethane being in one piece with the reinforcement base member. The polyurethane constituting at least an outer circumferential surface of the shoe press belt includes, as an urethane prepolymer component, an aliphatic polycarbonatediol component and an aromatic diisocyanate component, and includes, as a curing agent component, an aliphatic diol component having a carbon number of less than or equal to 6 and an aromatic diol component having two hydroxyethoxy groups. A content of the aromatic diol component with respect to the aliphatic diol component and the aromatic diol component is more than or equal to 10 mass % and less than or equal to 50 mass %.

In the shoe press belt, the aromatic diol component can be at least one of a 1,3-bis(2-hydroxyethoxy)benzene component and a 1,4-bis(2-hydroxyethoxy)benzene component.

In the shoe press belt, the aliphatic diol component can be a 1,4-butanediol component.

In the shoe press belt, the aliphatic polycarbonatediol component can include a 1,5-pentanediol component, a 1,6-hexanediol component, and a carbonate component.

In the shoe press belt, the aromatic diisocyanate component can be a diphenylmethane diisocyanate component.

Advantageous Effects of Invention

According to the description above, there can be provided a shoe press belt suppressed in generation and development of a crack.

DESCRIPTION OF EMBODIMENTS

Hereinafter, the present invention will be described with reference to figures. It should be noted that the same reference characters indicate the same or equivalent portions in the figures of the present invention. A dimensional relation such as a length, a width, a thickness, or a depth is modified as appropriate for clarity and brevity of the drawings and does not represent an actual dimensional relation.

[Shoe Press Device]

Figure 1:
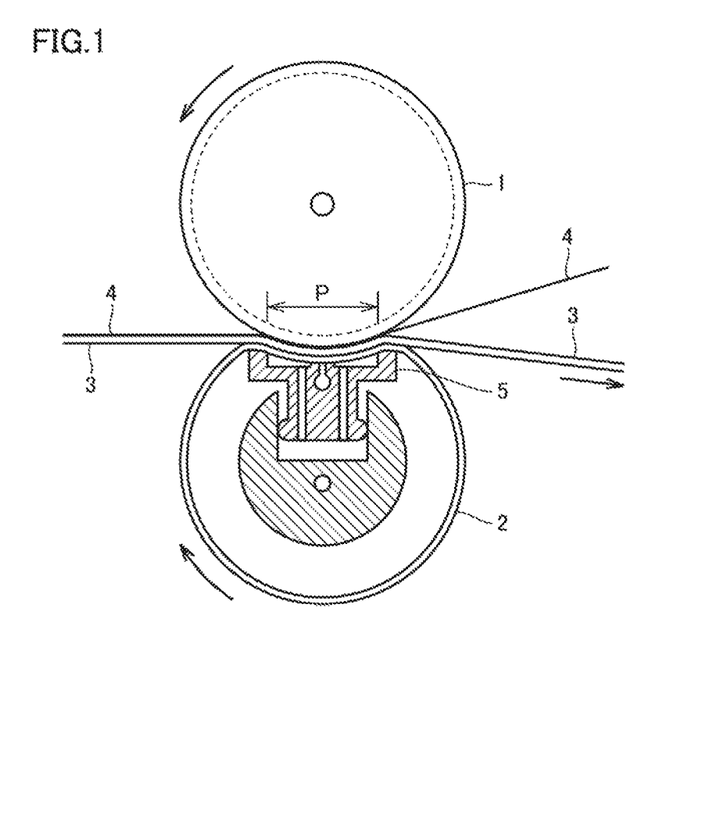
FIG. 1 is an explanatory diagram illustrating a shoe press device.

FIG. 1 shows an exemplary shoe press device used for a press part in a paper-making process. In FIG. 1, a flexible, cylindrical shoe press belt 2 is provided below a press roll 1. Between shoe press belt 2 and press roll 1, a felt 3 and a wet paper web 4 pass. The outer circumferential surface of shoe press belt 2 is in direct contact with felt 3. A pressure applying shoe 5 is pressed against the inner circumferential surface of shoe press belt 2 toward the press roll 1 side. Lubricating oil is supplied between pressure applying shoe 5 and shoe press belt 2 to allow shoe press belt 2 to travel smoothly. Shoe press belt 2 slides and travels on pressure applying shoe 5 with a friction with felt 3. The surface of pressure applying shoe 5 has a recess shape corresponding to the surface of press roll 1. Between press roll 1 and pressure applying shoe 5, a pressure-applying/dewatering portion P having a wide width is formed. At this pressure-applying/dewatering portion P, wet paper web 4 is dewatered.

[Shoe Press Belt]

Figure 2:
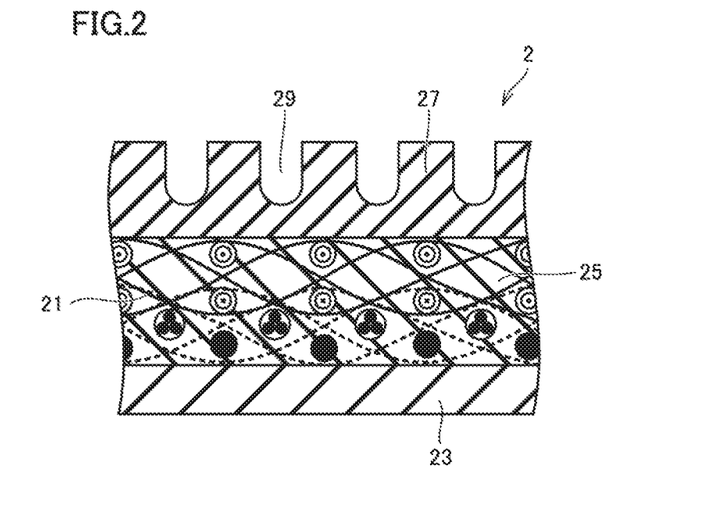
FIG. 2 is a partial cross sectional view showing an exemplary shoe press belt of one embodiment of the present invention.

FIG. 2 shows exemplary shoe press belt 2. Shoe press belt 2 shown in FIG. 2 includes: a base fabric 21 (an exemplary reinforcement base member) constituted of a multiple fabric; an intermediate polyurethane layer 25 with which base fabric 21 is impregnated; an inner polyurethane layer 23 provided at an inner side relative to intermediate polyurethane layer 25; and a polyurethane layer (hereinafter, referred to as "outermost circumferential polyurethane layer") 27 provided at an outer side relative to intermediate polyurethane layer 25 and constituting the outer circumferential surface of shoe press belt 2.

Inner polyurethane layer 23 and intermediate polyurethane layer 25 including base fabric 21 are joined to and are in one piece with each other at an interface therebetween. Moreover, intermediate polyurethane layer 25 including base fabric 21, and outermost circumferential polyurethane layer 27 are joined to and are in one piece with each other at an interface therebetween. That is, in shoe press belt 2, inner polyurethane layer 23, intermediate polyurethane layer 25 including base fabric 21, and outermost circumferential polyurethane layer 27 are joined to and are in one piece with one another in this order at the respective interfaces. Moreover, outermost circumferential polyurethane layer 27 has a surface provided with a multiplicity of drainage grooves 29 formed along the traveling direction, thereby increasing dewatering efficiency.

The configuration of the shoe press belt of the present invention is not limited to shoe press belt 2 shown in FIG. 2. For example, one or more polyurethane layers may be further provided between intermediate polyurethane layer 25 and outermost circumferential polyurethane layer 27. Moreover, the location of the interface between inner polyurethane layer 23 and intermediate polyurethane layer 25 and the location of the interface between intermediate polyurethane layer 25 and outermost circumferential polyurethane layer 27 respectively coincide with rear and front surfaces of base fabric 21 in FIG. 2, but may be deviated toward the inner polyurethane layer 23 side or the outermost circumferential polyurethane layer 27 side with respect to the front surface of base fabric 21.

Moreover, the shoe press belt of the present invention may be configured such that base fabric 21 is impregnated and covered with a single polyurethane layer or such that base fabric 21 is impregnated and covered with two polyurethane layers. In each of the cases, base fabric 21 and the polyurethane layer(s) are in one piece, thus constituting the shoe press belt.

Moreover, the reinforcement base member of shoe press belt 2 is not limited to base fabric 21, and may be a base fabric, reinforcing yarns, a mesh object, or a combination thereof. For the configuration and material of the reinforcement base member, the configuration and material of a member included in the conventional shoe press belt as a reinforcement base member can be used without particular limitations.

[Polyurethane]

The polyurethane constituting at least the outer circumferential surface of such a shoe press belt 2 is a reaction product of: an urethane prepolymer including an aliphatic polycarbonatediol and an aromatic diisocyanate; and a curing agent including an aliphatic diol having a carbon number of less than or equal to 6 and an aromatic diol having two hydroxyethoxy groups. Hence, the polyurethane includes, as an urethane prepolymer component, an aliphatic polycarbonatediol component and an aromatic diisocyanate component, and includes, as a curing agent component, an aliphatic diol component having a carbon number of less than or equal to 6 and an aromatic diol component having two hydroxyethoxy groups. A content of the aromatic diol component with respect to the aliphatic diol component and the aromatic diol component is more than or equal to 10 mass % and less than or equal to 50 mass %. In such a polyurethane, generation and development of a crack are suppressed. Therefore, generation and development of a crack are suppressed in shoe press belt 2 having the outer circumferential surface constituted of such a polyurethane.

The polyurethane preferably has a Shore A hardness of more than or equal to 91 and less than or equal to 97. The lower limit value of the Shore A hardness is more preferably 93. The upper limit value of the Shore A hardness is more preferably 96, and is further preferably 95. When the Shore A hardness of the thermosetting polyurethane of the present invention is less than or equal to 90, the compression set resistance may be deteriorated. On the other hand, when the Shore A hardness of the thermosetting polyurethane of the present invention is more than or equal to 98, deterioration of crack resistance is concerned. When the Shore A hardness of the thermosetting polyurethane of the present invention is more than or equal to 91 (more preferably, more than or equal to 93), the compression set resistance is excellent and a sufficient retention ratio of the VV of the drainage grooves can be secured. When the Shore A hardness of the thermosetting polyurethane of the present invention is less than or equal to 97 (more preferably less than or equal to 96, and further preferably less than or equal to 95), performance in preventing generation and development of a crack becomes particularly excellent. In the present specification, the Shore A hardness means a hardness measured in accordance with a method described in JIS K 6253-3:2012.

The polyurethane is synthesized by cured in accordance with a prepolymer method in which an urethane prepolymer and a curing agent are reacted with each other. Hence, a large-sized resin product such as a shoe press belt can be manufactured stably as compared with a polyurethane cured in accordance with a one shot method. For a method of synthesizing the polyurethane, a conventionally known method can be used without particular limitations as the method of synthesizing by curing in accordance with the prepolymer method.

An analysis is not particularly limited for the aliphatic polycarbonatediol component and the aromatic diisocyanate component, which are included as the urethane prepolymer component in the polyurethane, as well as the aliphatic diol component having a carbon number of less than or equal to 6 and the aromatic diol component having two hydroxyethoxy groups, which are included as the curing agent component in the polyurethane. An analysis method, such as pyrolysis-gas chromatography-mass spectroscopy (PyGC-MS), can be used. Here, although depending on the analysis method and analysis conditions employed, each component may be a corresponding source material or a corresponding product such as an oxide thereof, a reduced substance thereof or a derivative thereof; however, a source material corresponding to each component can be specified by the employed analysis method. Moreover, the content of each component refers to a mass ratio when each component is converted into a corresponding source material. From type and content of each component of the polyurethane, type and content of each corresponding component of the polyurethane source material can be specified.

<Urethane Prepolymer Component>

The urethane prepolymer component is a component originated from an urethane prepolymer including an aliphatic polycarbonatediol and an aromatic diisocyanate. Hence, the urethane prepolymer component includes an aliphatic polycarbonatediol component and an aromatic diisocyanate component. The urethane prepolymer component may be only the same type of urethane prepolymer component including the same type of aliphatic polycarbonatediol component and the same type of aromatic diisocyanate component, or a different type of urethane prepolymer component may be used together.

(Aliphatic Polycarbonatediol Component)

The aliphatic polycarbonatediol component suitably has a carbon number of more than or equal to 2 and less than or equal to 12. The aliphatic polycarbonatediol component serves to improve a hydrolysis resistance of the polyurethane, but can also serve to generate and develop a crack due to its high crystallinity. Therefore, in order to decrease crystallinity of the polyurethane, the aliphatic polycarbonatediol component is preferably a hetero-type copolymerization-based aliphatic polycarbonatediol component, and is more preferably an aliphatic C5/C6 copolymerization-based polycarbonatediol component including a 1,5-pentanediol component, a 1,6-hexanediol component, and a carbonate component.

In order to suppress generation and development of a crack in the polyurethane, a number average molecular weight of the aliphatic polycarbonatediol component when converted into a corresponding aliphatic polycarbonatediol is preferably more than or equal to 1000 and less than or equal to 3000, and is more preferably more than or equal to 1000 and less than or equal to 2000.

The aliphatic polycarbonatediol corresponding to the aliphatic polycarbonatediol component is obtained by an esterification reaction between a carbonate and a mixture of two or more types of hydrocarbondiols each having a carbon number of more than or equal to 2 and less than or equal to 12 and having different carbon numbers. As the method of synthesizing such an aliphatic polycarbonatediol, a conventionally known aliphatic polycarbonatediol synthesizing method can be used without particular limitations.

The mixture of the two or more types of hydrocarbondiols having different carbon numbers preferably includes two or more types of chain hydrocarbondiols having carbon numbers of more than or equal to 2 and less than or equal to 12, more preferably includes two or more types of chain hydrocarbondiols having carbon numbers of more than or equal to 2 and less than or equal to 6, and further preferably includes chain hydrocarbondiols having carbon numbers of 5 and 6. For example, the mixture of the two or more types of hydrocarbondiols having different carbon numbers is preferably a mixture of 1,5-pentanediol and 1,6-hexanediol. When the mixture of 1,5-pentanediol and 1,6-hexanediol is used as the mixture of the two or more types of hydrocarbondiols having different carbon numbers, a C5/C6 copolymerization-based polycarbonatediol is obtained.

A blending ratio of the two or more types of hydrocarbondiols having different carbon numbers in the mixture is not particularly limited. In a mixture of two types of hydrocarbondiols having different carbon numbers, the hydrocarbondiols are preferably blended at a molar ratio of 1:9 to 9:1, and are more preferably blended at a molar ratio of 4:6 to 6:4. Most preferably, the hydrocarbondiols are a mixture of 1,5-pentanediol and 1,6-hexanediol, and they are blended at a molar ratio of 4:6 to 6:4.

The carbonate is not limited particularly as long as it has an ester bond in its molecule, but is preferably ethylene carbonate, dimethyl carbonate, diethyl carbonate, diphenyl carbonate, or the like.

(Aromatic Diisocyanate Component) The aromatic diisocyanate component is not limited as long as the aromatic diisocyanate corresponding to the aromatic diisocyanate component has an aromatic ring and two NCO groups in its molecule, but is preferably diphenylmethane diisocyanate (MDI (methylene diphenyl diisocyanete)), 1,4-phenylene diisocyanate (PPDI (p-phenylene diisocyanete)), or the like.

<Curing Agent Component>

The curing agent component is a component originated from the curing agent including the aliphatic diol having a carbon number of less than or equal to 6 and the aromatic diol having two hydroxyethoxy groups. Hence, the curing agent component includes the aliphatic diol component having a carbon number of less than or equal to 6 and the aromatic diol component having two hydroxyethoxy groups. Here, in order to improve flexibility of the polyurethane and suppress generation and development of a crack, the content of the aromatic diol component with respect to the aliphatic diol component and the aromatic diol component is more than or equal to 10 mass % and less than or equal to 50 mass %, and is preferably more than or equal to 10 mass % and less than or equal to 20 mass %.

(Aliphatic Diol Component)

In order to improve flexibility of the polyurethane and suppress generation and development of a crack, each of the aliphatic diol component and the aliphatic diol corresponding to the aliphatic diol component has a carbon number of less than or equal to 6 and preferably has a carbon number of more than or equal to 4. The aliphatic diol component is preferably a 1,4-butanediol component, for example.

(Aromatic Diol Component)

In order to improve flexibility of the polyurethane and suppress generation and development of a crack, the aromatic diol component is an aromatic diol component having two hydroxyethoxy groups, is preferably at least one of a 1,3-bis(2-hydroxyethoxy)benzene component and a 1,4-bis(2-hydroxyethoxy)benzene component, and is more preferably 1,3-bis(2-hydroxyethoxy)benzene component.

EXAMPLES

In Experiment Examples A to C, the present invention will be described more in detail with reference to Examples and Comparative Examples; however, the present invention is not limited thereto.

<Experiment Example A>

(Preparation of Material to Serve as Outermost Circumferential Polyurethane Layer)

In order to prepare an urethane prepolymer for manufacturing the outermost circumferential polyurethane layer, a first urethane prepolymer and a second urethane prepolymer, which had characteristics shown in Table 1, were prepared. Moreover, as the curing agent, there were prepared: the product name "1,4-butanediol" (provided by Mitsubishi Chemical Corporation; hereinafter, referred to as "1,4-BD" in the specification and Tables); the product name "DER" (provided by Mitsui Fine Chemicals; hereinafter, referred to as "DER" in the specification and Tables), which is 1,3-bis(2-hydroxyethoxy)benzene; and the product name "BHEB (registered trademark)" (provided by Mitsui Fine Chemicals; hereinafter, referred to as "BHEB" in the specification and Tables), which is 1,4-bis(2-hydroxyethoxy)benzene.

TABLE 1

| | Urethane Prepolymer | | | |
|---|---|---|---|---|
| | Material | | | |
| | Aliphatic Polycarbonatediol (PCD) | | Aromatic | NCO % |
| | Type | Mn | Diisocyanate | (mass %) |
| First Urethane Prepolymer | Aliphatic C5/C6 Copolymerization-Based PCD | 2000 | MDI | 8.35 |
| Second Urethane Prepolymer | Aliphatic C5/C6 Copolymerization-Based PCD | 2000 | MDI | 10.29 |

(Manufacturing of Shoe Press Belt)

First, there was prepared a base fabric that had a thickness of 2.5 mm and that was constituted of a fabric having a configuration shown in Table 2 and quadruple-woven longitudinally and double-woven laterally.

TABLE 2

| | Material | Thickness | Number (Number/Inch) |
|---|---|---|---|
| Warp in First Layer | 6,6 Nylon Strand | About 500 d × 3 | 14(+0/−1) |
| Warp in Second Layer | 6,6 Nylon Strand | About 500 d × 3 | 14(+0/−1) |
| Warp in Third Layer | Polyester Strand | 1000 d × 3 | 14(+0/−1) |
| Warp in Fourth Layer | 6 Nylon Single Yarn | φ0.35 mm | 14(+0/−1) |
| Weft on Front Side | Polyester Single Yarn | φ0.40 mm | 29(+0/−1) |
| Weft on Rear Side | Polyester Single Yarn | φ0.40 mm | 29(+0/−1) |

Next, a portion of the intermediate polyurethane layer and the inner polyurethane layer were produced. Specifically, the urethane prepolymer was prepared by mixing, at a mass ratio of 30:70, the product name "HIPRENE L-100" (urethane prepolymer provided by Mitsui Chemicals: NCO %=4.2; hereinafter, referred to as "L-100" in the specification and Tables) and the product name "HIPRENE L-167" (an urethane prepolymer provided by Mitsui Chemicals: NCO %=6.4; hereinafter, referred to as "L-167" in the specification and Tables). It should be noted that each of "HIPRENE L-100" and "HIPRENE L-167" includes polytetramethylene ether glycol (PTMG) as a polyol component, and includes TDI as the aromatic diisocyanate. 100 parts by mass of this urethane prepolymer (NCO %=5.74) and 15.9 parts by mass of dimethylthiotoluenediamine (the product name "ETHACURE 300" provided by Albemarle; hereinafter, referred to as "DMTDA" in the specification and Tables) serving as the curing agent were defoamed individually and then were mixed. In this way, the material to serve as each of the intermediate polyurethane layer and the inner polyurethane layer was prepared.

The base fabric is impregnated with the prepared material from a surface of the base fabric (lower surface of base fabric 21 shown in FIG. 2) to about 50% of the thickness of the base fabric (corresponding to a portion of the intermediate polyurethane layer), and is further coated with the same material with a thickness of more than or equal to 1.0 mm (corresponding to the inner polyurethane layer). Heating was performed for 8 hours under a temperature condition of 120° C. Further, the polyurethane coating the base fabric was cut and polished. Accordingly, the thickness of the polyurethane from the front surface of the base fabric (corresponding to the thickness of the inner polyurethane layer) became 1.0 mm. Then, the base fabric was reversed such that the surface coated with the polyurethane was located at the inner side.

Next, the base fabric is impregnated with the material to serve as the intermediate polyurethane layer from a surface of the base fabric (upper surface of base fabric 21 shown in FIG. 2; surface located opposite to the inner polyurethane layer) to a plane of the already provided portion of the intermediate polyurethane layer, thus coating the surface of the base fabric. Then, the surface of the polyurethane coating the base fabric was smoothened using a doctor blade such that the surface of the polyurethane substantially coincides with the position of the front surface of the base fabric. In this way, the intermediate polyurethane layer included to entirely extend from the rear surface to the front surface of the base fabric was produced. The thickness of the intermediate polyurethane layer was 2.5 mm.

Next, the surface of the intermediate polyurethane layer is coated with the material prepared to serve as the outermost circumferential polyurethane layer. Here, the material to serves as the outermost circumferential polyurethane layer was prepared in the following manner: a blending amount, shown in Table 3, of an urethane prepolymer obtained by mixing the above-described prepared first urethane prepolymer and second urethane prepolymer at a mass ratio shown in Table 3 was mixed with a blending amount, shown in Table 3, of a curing agent obtained by mixing the above-described prepared 1,4-BD and DER or BHEB at a mass ratio shown in Table 3.

Then, heating was performed for 12 hours under a temperature condition of 130° C. Further, the surface of the outermost circumferential polyurethane layer was cut and polished such that the outermost circumferential polyurethane layer had a thickness of 2.0 mm. Then, a multiplicity of drainage grooves (width of 0.9 mm; depth of 1.0 mm; pitch of 2.54 mm) were formed in the surface of the outermost circumferential polyurethane layer along the circumferential direction.

Accordingly, the inner polyurethane layer (thickness of 1.0 mm; Shore A hardness of 93), the intermediate polyurethane layer (thickness of 2.5 mm; Shore A hardness of 93), the outermost circumferential polyurethane layer (thickness of 2.0 mm; for Shore A hardness, see Table 3), and the base fabric were adhered to and were in one piece with one another, thereby obtaining a shoe press belt (Examples A1 to A25). Table 3 shows classifications of the Examples of the present disclosure and the Comparative Examples with regard to Examples A1 to A25.

TABLE 3

| Experiment Example A (Example/Comparative Example) | Urethane Prepolymer Mass Ratio | | NCO % | Blending Amount (Parts by Mass) | Curing Agent Mass Ratio | | | Equivalent Amount Value |
|---|---|---|---|---|---|---|---|---|
| | First Urethane Prepolymer | Second Urethane Prepolymer | | | 1,4-BD | DER | BHEB | |
| A1 (Example) | 80 | 20 | 8.61 | 100 | 90 | 10 | — | 47.66 |
| A2 (Example) | 80 | 20 | 8.61 | 100 | 85 | 15 | — | 49.07 |
| A3 (Example) | 80 | 20 | 8.61 | 100 | 80 | 20 | — | 50.58 |
| A4 (Example) | 80 | 20 | 8.61 | 100 | 70 | 30 | — | 53.87 |
| A5 (Example) | 80 | 20 | 8.61 | 100 | 50 | 50 | — | 61.95 |
| A6 (Comparative Example) | 80 | 20 | 8.61 | 100 | 25 | 75 | — | 76.25 |
| A7 (Comparative Example) | 80 | 20 | 8.61 | 100 | 0 | 100 | — | 99.11 |
| A8 (Example) | 80 | 20 | 8.61 | 100 | 90 | — | 10 | 47.66 |
| A9 (Example) | 80 | 20 | 8.61 | 100 | 85 | — | 15 | 49.07 |
| A10 (Example) | 80 | 20 | 8.61 | 100 | 80 | — | 20 | 50.58 |
| A11 (Example) | 80 | 20 | 8.61 | 100 | 70 | — | 30 | 53.87 |
| A12 (Example) | 80 | 20 | 8.61 | 100 | 50 | — | 50 | 61.95 |
| A13 (Comparative Example) | 80 | 20 | 8.61 | 100 | 25 | — | 75 | 76.25 |
| A14 (Comparative Example) | 80 | 20 | 8.61 | 100 | 0 | — | 100 | 99.11 |
| A15 (Example) | 60 | 40 | 8.99 | 100 | 85 | 15 | — | 49.07 |
| A16 (Example) | 60 | 40 | 8.99 | 100 | 80 | 20 | — | 50.58 |
| A17 (Example) | 60 | 40 | 8.99 | 100 | 85 | — | 15 | 49.07 |
| A18 (Example) | 60 | 40 | 8.99 | 100 | 80 | — | 20 | 50.58 |
| A19 (Example) | 60 | 40 | 8.99 | 100 | 90 | 10 | — | 47.66 |
| A20 (Example) | 100 | 0 | 8.22 | 100 | 90 | 10 | — | 47.66 |
| A21 (Example) | 100 | 0 | 8.22 | 100 | 85 | 15 | — | 49.07 |
| A22 (Example) | 100 | 0 | 8.22 | 100 | 80 | 20 | — | 50.58 |
| A23 (Example) | 0 | 100 | 10.15 | 100 | 90 | 10 | — | 47.66 |
| A24 (Example) | 0 | 100 | 10.15 | 100 | 85 | 15 | — | 49.07 |
| A25 (Example) | 0 | 100 | 10.15 | 100 | 80 | 20 | — | 50.58 |

| Experiment Example A (Example/Comparative Example) | Curing Agent Blending Amount (Parts by Mass) | α Value | Shore A Hardness | Hydrolysis Resistance Retention Ratio of Breaking Strength (%) | Generation of Crack Number of Times of Pulling (×10,000 times) | Development of Crack Crack Development Rate (mm/1,000 times) |
|---|---|---|---|---|---|---|
| A1 (Example) | 10.0 | 1.02 | 94 | 92 | >40 | 0.1 |
| A2 (Example) | 10.3 | 1.02 | 94 | 91 | >40 | 0.1 |
| A3 (Example) | 10.6 | 1.02 | 94 | 92 | >40 | 0.1 |
| A4 (Example) | 11.3 | 1.02 | 94 | 93 | >40 | 0.1 |
| A5 (Example) | 12.9 | 1.02 | 94 | 90 | 37 | 0.3 |
| A6 (Comparative Example) | 15.9 | 1.02 | 97 | 91 | 0.2 | >10 |
| A7 (Comparative Example) | 20.7 | 1.02 | 100 | 96 | 0.01 | >10 |
| A8 (Example) | 10.0 | 1.02 | 94 | 95 | >40 | 0.1 |
| A9 (Example) | 10.3 | 1.02 | 94 | 100 | >40 | 0.1 |
| A10 (Example) | 10.6 | 1.02 | 94 | 92 | 35 | 0.1 |
| A11 (Example) | 11.3 | 1.02 | 94 | 90 | 32 | 0.1 |
| A12 (Example) | 12.9 | 1.02 | 94 | 90 | 31 | 0.3 |
| A13 (Comparative Example) | 15.9 | 1.02 | 98 | 100 | 0.1 | >10 |
| A14 (Comparative Example) | 20.7 | 1.02 | 100 | 98 | 0.01 | >10 |
| A15 (Example) | 10.7 | 1.02 | 95 | 90 | >40 | 0.1 |
| A16 (Example) | 11.0 | 1.02 | 95 | 90 | >40 | 0.1 |
| A17 (Example) | 10.7 | 1.02 | 95 | 92 | >40 | 0.1 |

TABLE 3-continued

| | | | | | |
|---|---|---|---|---|---|
| A18 (Example) | 11.0 | 1.02 | 95 | 90 | >40 | 0.1 |
| A19 (Example) | 10.4 | 1.02 | 95 | 93 | >40 | 0.1 |
| A20 (Example) | 9.5 | 1.02 | 93 | 90 | >40 | 0.1 |
| A21 (Example) | 9.8 | 1.02 | 93 | 90 | >40 | 0.1 |
| A22 (Example) | 10.1 | 1.02 | 93 | 92 | >40 | 0.1 |
| A23 (Example) | 11.7 | 1.02 | 97 | 93 | 30 | 0.2 |
| A24 (Example) | 12.1 | 1.02 | 97 | 92 | 30 | 0.2 |
| A25 (Example) | 12.5 | 1.02 | 97 | 90 | 30 | 0.2 |

Note)
1,4-BD: 1,4-butanediol; DER: 1,3-bis(2-hydroxyethoxy)benzene; BHEB: 1,4-bis(2-hydroxyethoxy)benzene <Experiment Example B>

Each of shoe press belts was manufactured in the same manner as in Experiment Example A except that the material to serve as the outermost circumferential polyurethane layer was prepared by mixing a blending amount, shown in Table 4, of the above-described prepared 1,4-BD (curing agent) with a blending amount, shown in Table 4, of the urethane prepolymer obtained by mixing the above-described prepared first urethane prepolymer and second urethane prepolymer at a mass ratio shown in Table 4 (Examples B1 to B4). Each of Examples B1 to B4 was classified as a Comparative Example because the outermost circumferential polyurethane layer includes neither of the DER and the BHEB each serving as the curing agent component.

TABLE 4

| Experiment Example B (Example/Comparative Example) | Urethane Prepolymer | | | Curing Agent (1,4BD) | | | | Hydrolysis Resistance Retention | Generation of Crack Number of | Development of Crack Crack |
|---|---|---|---|---|---|---|---|---|---|---|
| | Mass Ratio | | Blending | | Blending | | | | | |
| | First Urethane Prepolymer | Second Urethane Prepolymer | NCO % | Amount (Parts by Mass) | Equivalent Amount Value | Amount (Parts by Mass) | α Value | Shore A Hardness | Ratio of Breaking Strength (%) | Times of Pulling (×10,000 times) | Development Rate (mm/1,000 times) |
| B1 (Comparative Example) | 100 | 0 | 8.22 | 100 | 45.06 | 9.0 | 1.02 | 93 | 96 | 10 | 0.1 |
| B2 (Comparative Example) | 80 | 20 | 8.61 | 100 | 45.06 | 9.4 | 1.02 | 94 | 90 | 10 | 0.1 |
| B3 (Comparative Example) | 60 | 64 | 8.99 | 100 | 45.06 | 9.8 | 1.02 | 95 | 95 | 7 | 0.1 |
| B4 (Comparative Example) | 0 | 100 | 10.15 | 100 | 45.06 | 11.1 | 1.02 | 97 | 90 | 5 | 0.3 |

Note)
1,4-BD: 1,4-butanediol

<Experiment Example C>

Each of shoe press belts was manufactured in the same manner as in Experiment Example A except that the material to serve as the outermost circumferential polyurethane layer was prepared by mixing a blending amount, shown in Table 5, of the DMTDA (curing agent) with a blending amount, shown in Table 5, of an urethane prepolymer obtained by mixing L100 with L167 at a mass ratio shown in Table 5 (Examples C1 and C2). Each of Examples C1 and C2 was classified as a Comparative Example because the urethane prepolymer component of the outermost circumferential polyurethane layer included no aliphatic polycarbonatediol component and the outermost circumferential polyurethane layer included neither of the DER and BHEB serving as the curing agent component.

TABLE 5

| Experiment Example C (Example/Comparative Example) | Urethane Prepolymer | | | Curing Agent (DMTDA) | | | | Hydrolysis Resistance Retention | Generation of Crack Number of | Development of Crack Crack |
|---|---|---|---|---|---|---|---|---|---|---|
| | Mass Ratio | | | Blending Amount (Parts by Mass) | Equivalent Amount Value | Blending Amount (Parts by Mass) | α Value | Shore A Hardness | Ratio of Breaking Strength (%) | Times of Pulling (×10,000 times) | Development Rate (mm/1,000 times) |
| | L100 | L167 | NCO % | | | | | | | | |
| C1 (Comparative Example) | 30 | 70 | 5.74 | 100 | 107 | 15.9 | 1.08 | 93 | 41 | 10 | 0.4 |

TABLE 5-continued

| Experiment Example C (Example/Comparative Example) | Urethane Prepolymer | | | Curing Agent (DMTDA) | | | | Hydrolysis Resistance Retention | Generation of Crack Number of | Development of Crack Crack |
|---|---|---|---|---|---|---|---|---|---|---|
| | Mass Ratio | | Blending Amount (Parts by Mass) | Equivalent Amount Value | Blending Amount (Parts by Mass) | α Value | Shore A Hardness | Ratio of Breaking Strength (%) | Times of Pulling (×10,000 times) | Development Rate (mm/1,000 times) |
| | L100 | L167 | NCO % | | | | | | | |
| C2 (Comparative Example) | 0 | 100 | 6.40 | 100 | 107 | 17.6 | 1.08 | 95 | 38 | 5 | 0.5 |

Note)
L-100: PTMG-based TDI prepolymer; L-167: PTMG-based TDI prepolymer; DMTDA: dimethyl thio-toluene diamine <Evaluation on Hydrolysis Resistance: Tension Test>

Evaluations were made with regard to a hydrolysis resistance of the polyurethane constituting the outermost circumferential polyurethane layer of the shoe press belt obtained in each of Experiment Examples A to C.

From each of the shoe press belts having respective outer circumferential surfaces provided with no drainage grooves, only the outermost circumferential polyurethane layer was sampled. Then, a plurality of dumbbell-shaped specimens (type 3 dumbbell-shaped punched pieces (thickness of 1 mm)) described in JIS K 6251:2017 (Rubber, vulcanized or thermoplastics—Determination of tensile stress-strain properties) were produced. Based on the method described in JIS K 6251:2017, the tensile strength (process time of 0 hour) of each of the dumbbell-shaped specimens was measured.

Next, several ones of the plurality of dumbbell-shaped specimens were introduced into a saturation type super-accelerating life tester (product name "PC-305111" provided by Hirayama Manufacturing Corporation) and were left therein at a saturated vapor temperature of 105° C. for 24 hours. After removing the dumbbell-shaped specimens from the saturation type super-accelerating life tester, the dumbbell-shaped specimens were naturally dried indoors for seven days. Then, in accordance with the above-described method, the tensile strength of the dumbbell-shaped specimen (process time of 24 hours) was measured. A retention ratio (process time: 24 hours) of breaking strength was calculated in accordance with the following formula:

[Retention ratio of breaking strength(process time: 24 hours)](%)=[tensile strength(process time: 24 hours)]/[tensile strength(process time: 0 hour)]× 100.

Results thereof are shown in Tables 3 to 5.

<Evaluation on Generation of Crack>

Evaluations were made with respect to whether or not a crack was generated in the outermost circumferential polyurethane layer of the shoe press belt obtained in each of Experiment Examples A to C.

Figure 3:
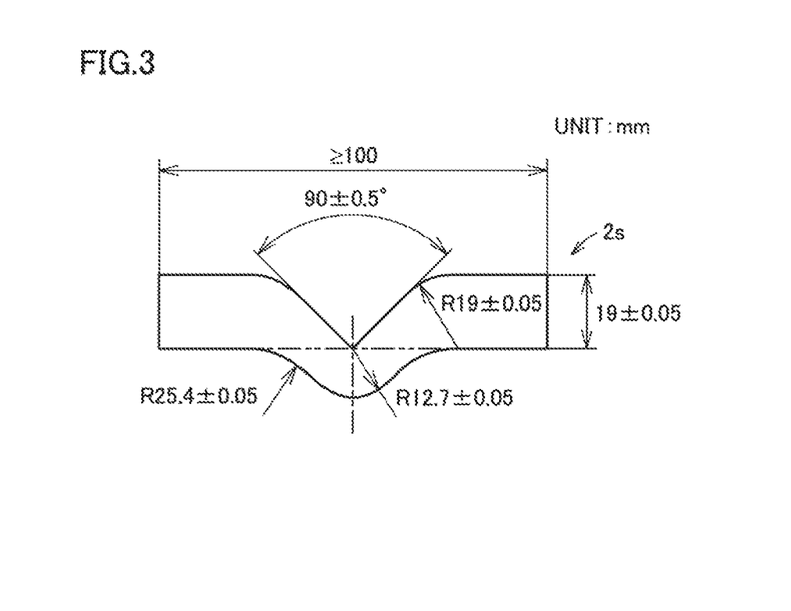
FIG. 3 is a schematic plan view showing a shape of an angle type specimen used for a repeated tension test for an evaluation on generation of a crack.
Figure 4:
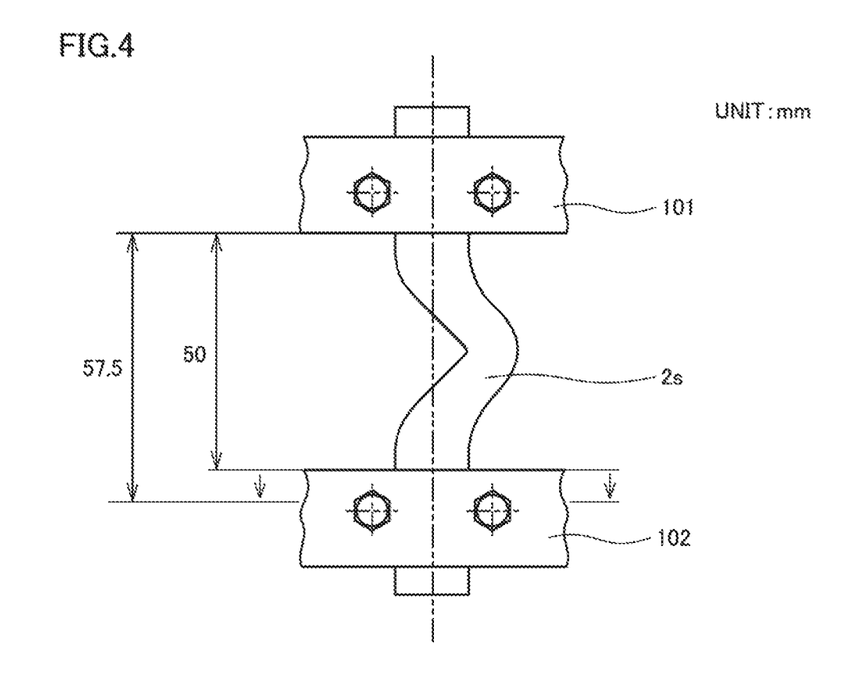
FIG. 4 is a schematic plan view showing an installation state of the angle type specimen and a manner of pulling the angle type specimen in the repeated tension test for an evaluation on generation of a crack.

From each of the shoe press belts having respective outer circumferential surfaces provided with no drainage grooves, only the outermost circumferential polyurethane layer was sampled. Then, a plurality of angle type specimens 2s with no cut (punched pieces (thickness of 1 mm)) shown in FIG. 3 and described in JIS K 6252-1:2015 were produced. A tension test was repeatedly performed using this angle type specimen. For the tension test, a De Mattia type bending tester was used, which was described in JIS K 6260:2017 (Rubber, vulcanized or thermoplastic—Determination of flex cracking and crack growth (De Mattia type)). With reference to FIG. 4, angle type specimen 2s was installed on an upper gripper 101 and a lower gripper 102 at a location at which a distance was minimum between upper gripper 101 and lower gripper 102. Upper gripper 101 is a fixation portion of the De Mattia type bending tester and lower gripper 102 is a movable portion of the De Mattia type bending tester. Then, a tension test was performed repeatedly. For reciprocating movement for pulling repeatedly, a minimum distance was 50.0 mm (expansion of 0%), a maximum distance was 57.5 mm (expansion of 15%), and a movement distance was 7.5 mm. Under this condition, pulling was repeated from the expansion of 0% to the expansion of 15% until a crack was generated in an interior angle portion of the angle type specimen with no cut. Results thereof are shown in Tables 3 to 5. In Table 3, the notation ">40" indicates that no crack was generated even though the angle type specimen with no cut was pulled repeatedly 400,000 times. In the present test, it is understandable that a crack is unlikely to be generated in the outermost circumferential polyurethane layer of the shoe press belt when the number of times of pulling is >300,000.

<Evaluation on Development of Crack>

Evaluations were made with respect to development of a crack in the outermost circumferential polyurethane layer of the shoe press belt obtained in each of Examples A to C.

The shoe press belt having the outer circumferential surface provided with no drainage grooves was cut, thereby producing a strip-shaped specimen (length of 150 mm; width of 20 mm; thickness of 5.5 mm). A cut having a length of 3.5 mm and a depth of 2.0 mm was provided in the center of the strip-shaped specimen in the length direction and the outer surface of one end portion thereof (outermost circumferential polyurethane layer) in the width direction. The above-described De Mattia type bending tester was used to evaluate development of crack under the following condition: for reciprocating movement, the maximum distance was 80.5 mm, the minimum distance was 38.5 mm, and the movement distance was 42.0 mm. Under this condition, the strip-shaped specimen was bent until the tip of the crack reached a vicinity of the center of the strip-shaped specimen in the width direction, and then the size of the crack and the number of times of bending were measured. The size of the measured crack was divided by the number of times of bending (1000 times) to determine a crack development rate. Results thereof are shown in Tables 3 to 5. In the present test, it is understandable that when the crack development rate is low, development of a crack is prevented in the shoe press belt.

With reference to Table 3, the hydrolysis resistance was maintained to be high, the number of times of bending until generation of a crack was large, and the crack development rate was low in the polyurethane including, as the curing agent component, the 1,4-butanediol component, which is an aliphatic diol component having a carbon number of less than or equal to 6, and 1,3-bis(2-hydroxyethoxy)benzene (the product name "DER") component or 1,4-bis(2-hydroxyethoxy)benzene (the product name "BHEB (registered trademark)") component, which is an aromatic diol component having two hydroxyethoxy groups, wherein the content of the aromatic diol component with respect to the aliphatic diol component and the aromatic diol component is more than or equal to 10 mass % and less than or equal to 50 mass %. In view of this, a high crack resistance can be expected. On the other hand, with reference to Table 4 and Table 5, the number of times of bending until generation of a crack was small and the crack development rate was high in the urethane including, as the curing agent component, no aromatic diol component having two hydroxyethoxy groups.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: press roll; 2: shoe press belt; 2s: angle type specimen; 3: felt; 4: wet paper web; 5: pressure applying shoe; 21: base fabric; 23: inner polyurethane layer; 25: intermediate polyurethane layer; 27: outermost circumferential polyurethane layer; 29: drainage groove; 101: upper gripper; 102: lower gripper.

The invention claimed is:

1. A shoe press belt comprising a thermosetting polyurethane in which a reinforcement base member is embedded, the thermosetting polyurethane being in one piece with the reinforcement base member, wherein
the thermosetting polyurethane constituting at least an outer circumferential surface of the shoe press belt includes, as an urethane prepolymer component, an aliphatic polycarbonatediol component and an aromatic diisocyanate component, and includes, as a curing agent component, an aliphatic diol component having a carbon number of less than or equal to 6 and an aromatic diol component having two hydroxyethoxy groups, and
a content of the aromatic diol component with respect to the aliphatic diol component and the aromatic diol component is more than or equal to 10 mass% and less than or equal to 50 mass %.

2. The shoe press belt according to claim 1, wherein the aromatic diol component is at least one of a 1,3-bis(2-hydroxyethoxy)benzene component and a 1,4-bis(2-hydroxyethoxy)benzene component.

3. The shoe press belt according to claim 1, wherein the aliphatic diol component is a 1,4-butanediol component.

4. The shoe press belt according to claim 1, wherein the aliphatic polycarbonatediol component includes a 1,5-pentanediol component, a 1,6-hexanediol component, and a carbonate component.

5. The shoe press belt according to claim 1, wherein the aromatic diisocyanate component is a diphenylmethane diisocyanate component.

* * * * *